(12) United States Patent
Boucher et al.

(10) Patent No.: US 10,631,594 B2
(45) Date of Patent: Apr. 28, 2020

(54) FOOTWEAR ITEM HAVING A SIMPLIFIED STRUCTURE

(71) Applicant: SALOMON S.A.S., Metz-Tessy (FR)

(72) Inventors: Béatrice Boucher, Chilly (FR); Gérard Gautier, Yens (CH)

(73) Assignee: SALOMON S.A.S., Metz-Tessy (FR)

( * ) Notice: Subject to any disclaimer, the term of this patent is extended or adjusted under 35 U.S.C. 154(b) by 0 days.

(21) Appl. No.: 14/654,050

(22) PCT Filed: Dec. 6, 2013

(86) PCT No.: PCT/FR2013/000325
§ 371 (c)(1),
(2) Date: Jun. 19, 2015

(87) PCT Pub. No.: WO2014/096561
PCT Pub. Date: Jun. 26, 2014

(65) Prior Publication Data
US 2015/0313316 A1    Nov. 5, 2015

(30) Foreign Application Priority Data

Dec. 21, 2012   (FR) .................................. 12 03567

(51) Int. Cl.
*A43B 23/02* (2006.01)
*A43B 23/04* (2006.01)
*D04B 1/16* (2006.01)
*A43B 1/04* (2006.01)

(52) U.S. Cl.
CPC ........ *A43B 23/024* (2013.01); *A43B 23/0215* (2013.01); *A43B 23/0225* (2013.01); *A43B 23/0235* (2013.01); *A43B 23/0245* (2013.01); *A43B 23/0255* (2013.01); *A43B 23/042* (2013.01); *D04B 1/16* (2013.01); *A43B 1/04* (2013.01); *D10B 2401/041* (2013.01); *D10B 2403/023* (2013.01);
(Continued)

(58) Field of Classification Search
CPC . A43B 23/024; A43B 23/0255; A43B 23/042; A43B 1/04; A43B 23/0245; A43B 23/0265; A43B 23/0225
USPC .......................................... 36/93, 88, 45, 49
See application file for complete search history.

(56) References Cited

U.S. PATENT DOCUMENTS 2,147,197 A * 2/1939 Glidden ................... A43B 1/02
                                                           36/9 R
5,778,702 A * 7/1998 Wrightenberry ..... A41B 11/005
                                                              2/239
(Continued)

FOREIGN PATENT DOCUMENTS

WO   WO-2012/166244 A1   12/2012

*Primary Examiner* — Heather N Mangine
(74) *Attorney, Agent, or Firm* — Greenblum & Bernstein, P.L.C.

(57) ABSTRACT

An article of footwear includes a first envelope that extends lengthwise from a rear end to a front end, widthwise between a lateral side and a medial side, and heightwise from a bottom side to a top side, the first envelope comprising yarns linked to one another mechanically, at least a portion of the yarns comprising at least one hot-melt filament. The yarns comprising at least one hot-melt filament are distributed over the entire first envelope, and the shape of the first envelope is set by melting the yarns that comprise at least one hot-melt filament.

20 Claims, 9 Drawing Sheets

(52) U.S. Cl.
CPC .............. *D10B 2403/0331* (2013.01); *D10B 2403/0333* (2013.01); *D10B 2501/043* (2013.01); *Y02P 70/635* (2015.11)

(56) References Cited

U.S. PATENT DOCUMENTS

| | | | | |
|---|---|---|---|---|
| 6,158,254 | A * | 12/2000 | Richard | A41B 11/005 2/239 |
| 6,308,438 | B1 * | 10/2001 | Throneburg | A43B 1/02 36/11 |
| 7,370,438 | B2 * | 5/2008 | Vattes | A43B 7/1465 36/10 |
| 9,392,835 | B2 * | 7/2016 | Dekovic | A43B 23/02 |
| 9,675,134 | B2 * | 6/2017 | Kosui | A43B 17/003 |
| 2003/0089000 | A1 | 5/2003 | Tseng | |
| 2004/0118018 | A1 * | 6/2004 | Dua | A43B 1/04 36/45 |
| 2004/0205982 | A1 * | 10/2004 | Challe | A43B 9/02 36/55 |
| 2011/0265347 | A1 * | 11/2011 | Leary | A42C 2/007 36/93 |
| 2012/0011744 | A1 * | 1/2012 | Bell | A43B 1/0072 36/91 |
| 2012/0233882 | A1 | 9/2012 | Huffa et al. | |
| 2012/0266362 | A1 * | 10/2012 | Craig | D04B 1/26 2/239 |
| 2013/0260104 | A1 * | 10/2013 | Dua | B32B 5/02 428/175 |
| 2014/0137434 | A1 * | 5/2014 | Craig | A43B 1/04 36/54 |
| 2016/0302524 | A1 * | 10/2016 | Smith | A43B 13/12 |

* cited by examiner fig. 4 fig. 5 fig. 6

FOOTWEAR ITEM HAVING A SIMPLIFIED STRUCTURE

BACKGROUND

1. Field of the Invention

The invention relates to an article of footwear, such as a shoe or equivalent. The article of footwear can be used in fields such as walking, running on flat or mountainous terrain, skateboarding, ball-playing sports, cross-country skiing, snowboarding, snowshoeing, or the like.

2. Description of the Background

An article of footwear must fulfill various and sometimes contradictory functions, such as providing support and/or adequate tightening of the foot while providing satisfactory comfort. The article of footwear must also have a certain flexibility, a property that involves good conformability to certain foot deformations. In other words, the article of footwear must adapt to the foot while allowing it to have the freedom required for walking or practicing the sport involved.

To this end, it is known to make footwear, such as shoes, by combining an upper and a sole assembly. The upper generally includes a number of parts, such as a lateral quarter, a medial quarter, a vamp, a tongue, a heel, a rear counter, a protective toe-cap, a tightening device including keepers and a lace, an inner lining, and may even have additional parts. In addition, some of these parts may include a plurality of portions. The main problem with a shoe is in assembling and turning parts that are cut and assembled flat into a three-dimensional shape. Conventionally, the upper is associated with a lasting sole to demarcate a footwear element. According to a first method, the upper is glued to the lasting sole using an adhesive layer. The lasting sole, also referred to as the lasting board, is relatively rigid to withstand the assembly process. The gluing operation is carried out by pulling the upper and pressing it flat onto the lasting board, with a last being inserted in the upper. This is the traditional shoe lasting assembly. This technique makes it possible to exert sufficient pressure when heating the adhesive in order to obtain the footwear element. A second method, also known, involves obtaining the footwear element by stitching the upper to the lasting board. This is referred to as the Strobel assembly. The lasting board in this case is a flexible stitchable sole, referred to as the Strobel sole. For each of the first and second methods, the lasting board is integral with the sole assembly. The sole assembly further comprises external parts, such as one or more damping layers and a wear layer adapted to contact the ground, which are generally attached with an adhesive to the lasted board and upper. The sole assembly further comprises one or more inner layers arranged in the footwear element to fulfil protective functions in terms of hygiene, shock-absorption, arch support, or the like. Finally, the association of the footwear element with the other constituent parts of the sole assembly forms the shoe.

Irrespective of the method used for its manufacture, a shoe according to the prior art has certain drawbacks. First, the shoe uses a large number of parts, typically between forty and sixty. Such a large number of shoe-forming parts increases the number of manufacturing operations and the time required to carry out such operations. It usually takes forty minutes to one hour and thirty minutes to make a shoe. It can be said that shoes manufactured using conventional techniques are complicated, both by the number of their components and the number of manufacturing operations.

Another disadvantage results from the structural discontinuity of the shoe, in particular in the area of the upper. For example, a part of reduced size superimposed on another, larger part, may considerably modify the bendability of the upper in the location of the small part. This may hinder a user and also makes the shaping, i.e., three-dimensional shaping, of the shoe more difficult.

A further disadvantage is due to the presence of free spaces between the foot and the shoe. This means that the foot is not in contact with the upper or the sole assembly in certain areas. This is especially true in the area of certain portions of the junction between the upper and the lasting board. As a result, undesired displacements occur sometimes between the foot and the shoe, which can cause discomfort or injuries. Also, spaces sometimes appear between the foot, the ankle, or the lower leg and the upper, in the area of the foot-insertion opening. Consequently, undesired foreign bodies may penetrate into the shoe.

Finally, it can be said that a shoe according to the prior art does not always ensure support and/or adequate tightening of the foot, or does not always provide satisfactory comfort for the foot. Moreover, this shoe does not systematically conform to all foot deformations.

SUMMARY

In view of the foregoing, the present invention generally provides an improved article of footwear. In particular, the invention provides an article of footwear that adapts to the foot while allowing it to have the freedom required for walking or practicing a sport. In particular, the article of footwear ensures support and/or adequate tightening of the foot while offering satisfactory comfort for the foot. The article of footwear also conforms to foot deformations as much as possible.

Furthermore, the invention simplifies an article of footwear, while providing it with the capabilities required for the intended sporting activity. In particular, the invention reduces the number of constituent parts or elements of the footwear. The invention also reduces and simplifies the number of manufacturing operations, as well as the time required to carry out such operations.

The invention also reduces or eliminates any discomfort to the user.

To this end, the invention provides an article of footwear comprising a first casing, that is, a first envelope, the first casing extending lengthwise from a rear end to a front end, widthwise between a lateral side and a medial side, and heightwise from a base, or bottom side, to an upper end, or top side, the first casing including yarns linked to one another mechanically, at least a portion of the yarns comprising at least one hot-melt filament.

The yarns of the article of footwear include at least one hot-melt filament distributed over the entire first casing, and the shape of the first casing is set by heating the yarns to melt the at least one hot-melt filament.

As a consequence of this arrangement, the first casing can be shaped to have a geometry that is very similar to that of a foot and thereby conforms to the shape of the foot in a very uniform fashion. This means that the foot is in contact with, or at least very close to, the first casing. This results in an evenly distributed support of the foot, and very few undesired displacements, or no displacements, between the foot and the first casing. A resulting advantage is increased comfort of the article of footwear according to the invention, compared to a shoe from the prior art.

Another consequence of the arrangement according to the invention is that the first casing has structure continuity, in the sense that its inner surface and/or outer surface are at least substantially uniform, if not completely uniform. As described below, physical properties of the first casing can vary depending on zones of the casing, but the uniformity of the surfaces enables a more gradual variation of some of these physical properties. This is the case for bending, for example. This advantageously results in less or no discomfort for the user.

A synthesis of the foregoing shows that the first casing supports the foot and provides adequate comfort therefor. Furthermore, the first casing is capable of conforming to the foot deformations. This enables the article of footwear to fit comfortably in any situation, be it a static or dynamic situation.

A further consequence of the arrangement according to the invention is the reduced number of parts for manufacturing the article of footwear, although, as described below, the article of footwear can be provided with a few additional parts. The first casing in itself is a minimalist assembly compared to a footwear element according to the prior art, such as described above, which includes an upper that is attached to a lasting board. For example, the first casing of the invention is a unitary element which, by itself, replaces at least the lateral and medial quarters, a vamp, a tongue, a rear counter, a lasting board, or even more parts. As a corollary, the invention considerably reduces the number of manufacturing operations and the time required to carry them out. It generally takes less than thirty minutes to produce a shoe according to the invention. This resulting advantage is that the article of footwear according to the invention is much simpler, in any sense, than a shoe according to the prior art. However, as further described below, the structural simplicity of the invention does not reduce the number of technical functions performed by the article of footwear, compared to a shoe according to the prior art. Paradoxically, it can be said that the structural simplicity is a source of technical improvements in terms of quality and quantity.

BRIEF DESCRIPTION OF THE DRAWINGS

Other characteristics and advantages of the invention will be better understood from the description that follows, with reference to the annexed drawings illustrating, by way of non-limiting embodiments, how the invention may be implemented, and in which.

DETAILED DESCRIPTION

The first embodiment described below relates, for example, to an article of footwear for walking or running on horizontal or mountainous terrain. However, the first embodiment is applicable to other fields, such as those mentioned above.

The first embodiment is described below with reference to FIGS. 1 to 9.

Figure 1:
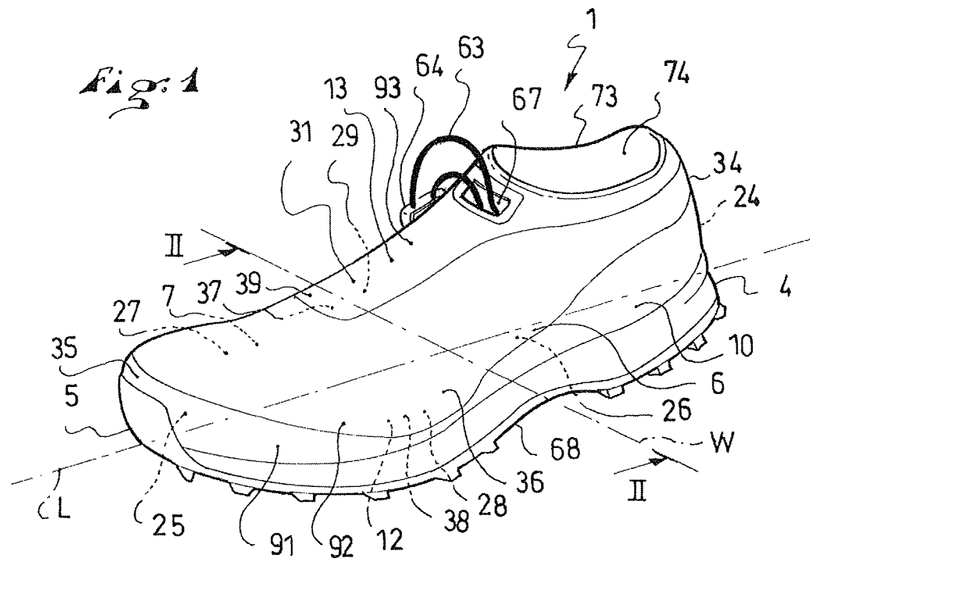
FIG. 1 is a front perspective top view of an article of footwear, according to a first embodiment of the invention.
Figure 2:
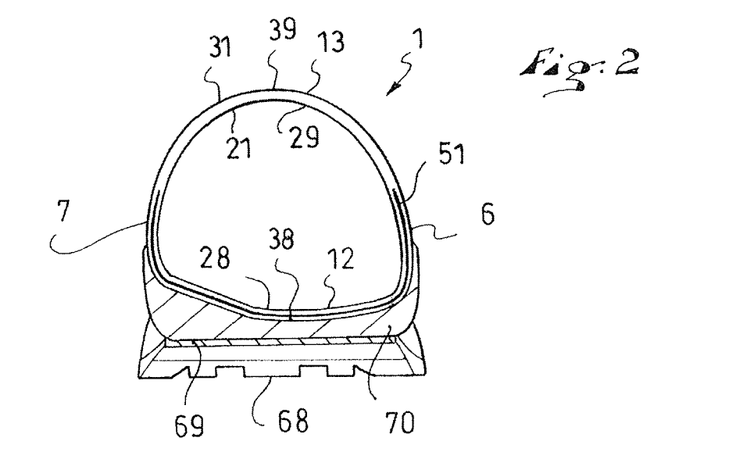
FIG. 2 is a cross section along the line II-II of FIG. 1.

As shown in FIGS. 1 and 2, an article of footwear 1 is provided to receive the foot of the user. For convenience, the article of footwear 1 will be considered as a shoe in the following description although, as will be shown in detail, its structure is completely unusual. Thus, the shoe 1 extends lengthwise along a longitudinal direction L, between a rear end or heel 4 and a front end or tip 5, and widthwise along a transverse direction W, between a lateral side 6 and a medial side 7.

As shown, the upper of the shoe 1 comprises a lower portion 10, provided to surround the foot, and includes no upper portion. Alternatively, however, the invention encompasses a shoe that includes both a lower portion and an upper portion, the latter being provided to surround the ankle and possibly the lower leg.

According to the first embodiment described, the shoe 1 extends height-wise from a base 12, or bottom side, to an upper end 13, or top side, that is to say, up to the free end of the lower portion 10 or the shoe 1. The base is a subdivision of the shoe, on which the foot takes support.

The shoe 1 is structured to allow good foot rolling movement during walking, transmission of sensory information and forces when taking support or jump landing. Therefore, the shoe 1, or article of footwear, is relatively flexible.

As described in detail below, the shoe 1 comprises a first casing 21, or envelope, extending lengthwise along the longitudinal direction L, from a rear end 24 to a front end 25, widthwise along the transverse direction W, between a lateral side 26 and a medial side 27, and heightwise from a base 28, or bottom side, to an upper end 29, or top side. This enables the first casing, or envelope, to surround and hold the foot of the user. For its construction, the first casing, or envelope, includes yarns linked to one another mechanically, as explained below. Also, at least a portion of the yarns comprise at least one hot-melt filament, as also explained below.

According to the invention, the yarns comprising at least one hot-melt filament are distributed over the entire first casing 21, that is, a transverse periphery of the first casing extends continuously and endlessly, and the shape of the first casing is set by melting the yarns that comprise at least one hot-melt filament. In fact, the melting enables the first casing 21 to maintain its shape by itself. This means that it does not collapse if no external force is applied thereto, even if it is not associated with other parts. It can be said that the first casing 21 is a unitary element, on the one hand, and that it is a self-supporting part, on the other hand. Accordingly, the first casing 21 provides the shape of the shoe 1. In other words, the rear end 24, the front end 25, the lateral side 26, the medial side 27, the base 28, or bottom side, and the upper end 29, or top side, of the first casing demarcate the rear end 4, the front end 5, the lateral side 6, the medial side 7, the base 12, or bottom side and the upper end 13, or top side, respectively, of the article of footwear or shoe 1. The minimalist structure used for the casing 21 ensures simplicity, lightness, and many other advantages, as explained below.

Without limitation, and still according to the first embodiment of the invention, the shoe 1 also includes a second casing 31, or second envelope, extending lengthwise along the longitudinal direction L, from a rear end 34 to a front end 35, widthwise in the transverse direction W, between a lateral side 36 and a medial side 37, and heightwise from a base 38, or bottom side, to an upper end 39, or top side. The second casing 31 also covers the foot, as does the first casing 21, or envelope. The second casing 31 is arranged outside of the first casing 21 and, thereby, indirectly covers the foot. The final shape of the shoe 1 is provided by both the first casing 21 and the second casing 31. The advantage of using two casings will be more apparent below.

Still in the context of the invention, the second casing 31 comprises yarns linked mechanically to one another, at least a portion of the yarns including at least one hot-melt filament, the yarns that comprise at least one hot-melt filament are distributed over the entire second casing 31, and the shape of the second casing is set by melting the yarns that comprise at least one hot-melt filament. Here again, the melting enables the second casing 31 to maintain its shape by itself. This means that it does not collapse if no external force is applied thereto, even if it is not associated with other parts. It can be said that the second casing 31 is a unitary element, on the one hand, and that it is a self-supporting part, on the other hand. Consequently, the second casing 31 also provides the shape of the shoe 1. In other words, the rear end 34, the front end 35, the lateral side 36, the medial side 37, the base 38, or bottom side, and the upper end 39, or top side, of the second casing 31 also demarcate the rear end 4, the front end 5, the lateral side 6, the medial side 7, the base 12, or bottom side, and the upper end 13, or top side, respectively, of the article of footwear or shoe 1. The minimalist structure used for the casing 31 ensures simplicity, lightness, and many other advantages, as will be seen below.

To better highlight the specificities of the invention, it is useful to describe how the casings 21, 31 are manufactured. This is done below with reference to FIGS. 3-6 in particular.

Figure 3:
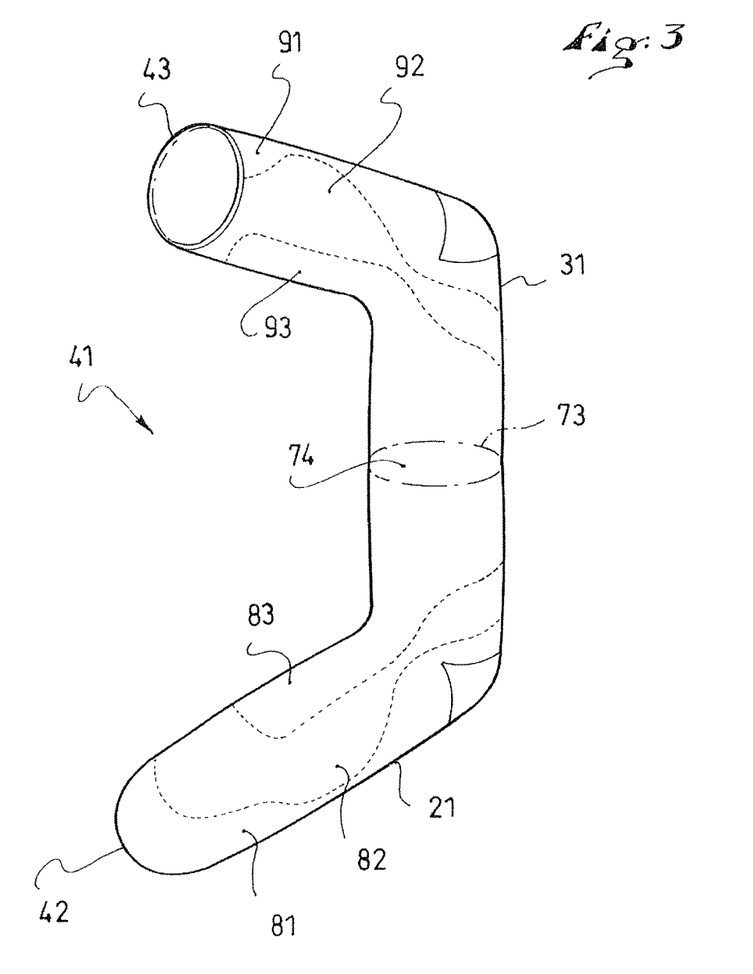
FIG. 3 is a schematic perspective view of a preform used for making a first casing and a second casing of the article of footwear according to FIG. 1.

As initially shown schematically in FIG. 3, each casing 21, 31 is obtained by manufacturing a sleeve 41, that is to say, a flexible tube made of yarns linked to one another mechanically. For this reason, the first casing 21 can be considered to be a first sleeve portion 21, and the second casing 31 can be considered to be a second sleeve portion 31. Alternatively, it can be said that a casing 21, 31 is a sock, as described below and in the drawing figures. The sleeve 41 is a preform for making the article 1. Without limitation, and in connection with the first embodiment, the sleeve 41, having a unitary one-piece structure, makes it possible to obtain both the first sleeve portion 21 and the second sleeve portion 31. The sleeve 41 extends lengthwise from a first end 42 to a second end 43. The first end 42 is closed using any technique known to one with ordinary skill in the art, such as stitching after folding, the addition of an end piece made of yarns linked to one another mechanically, or any equivalent. The second end 43 is merely an opening.

The sleeve 41 makes it possible to manufacture the casings 21, 31 in one piece. Here, the first casing 21 and second casing 31 are coextensive. This simplifies manufacture by reducing the number of parts and the time required for implementation.

Figure 4:
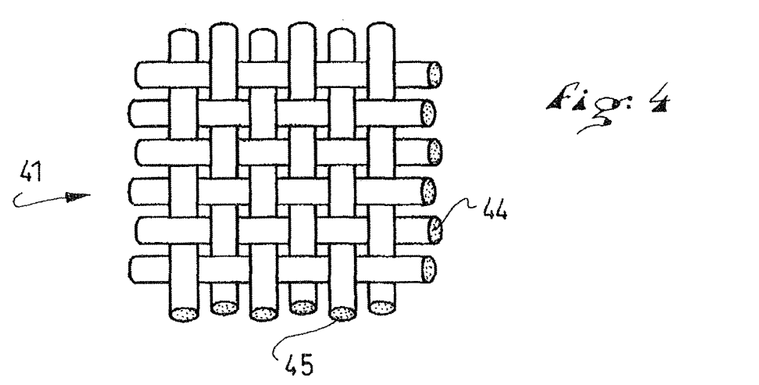
FIG. 4 is a schematic view related to the forming of a casing of the article of footwear according to FIG. 1.
Figure 5:
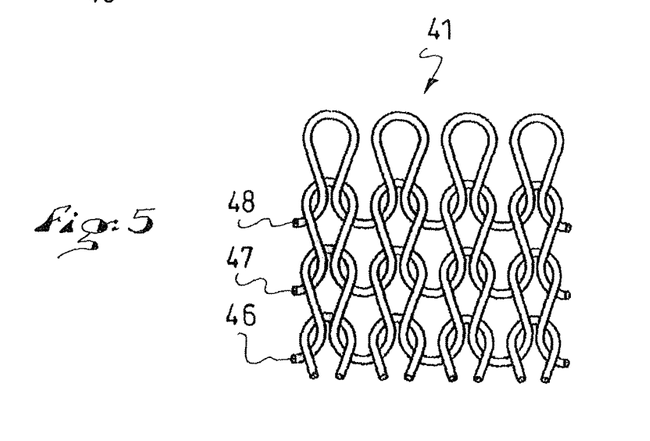
FIG. 5 is another schematic view related to the construction of a casing of the article of footwear according to of FIG. 1.
Figure 6:
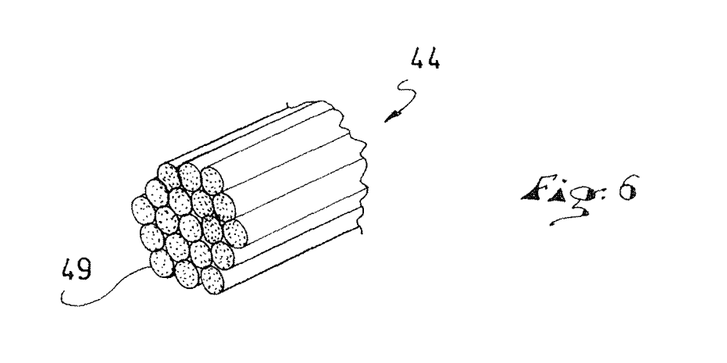
FIG. 6 is another schematic view related to the construction of a casing of the article of footwear according to FIG. 1.

The association of the yarns used to make the sleeve 41, and therefore the casings 21, 31, is presented with reference to FIGS. 4 and 5. Generally speaking, the yarns are provided to be associated with one another using any suitable textile technique, such as knitting, weaving, braiding, or the like. In the case of knitting, it is possible to use a single- or double-knit circular knitting machine, a cylindrical knitting machine, or a flat knitting machine. Two knitting zones may be joined to one another using the intarsia knitting technique or embroidery. Various decorative patterns can be obtained directly when knitting with the intarsia method, embroidery, the Jacquard knitting technique, or the like. FIG. 4 shows a conventional weaving with first yarns 44 oriented along a first direction, second yarns 45 oriented along a second direction, the first 44 and second 45 yarns intersecting to form a flexible mesh. FIG. 5 shows a knitting with three yarns 45, 47, 48 arranged in interpenetrating loops. However, a number of other arrangements are possible.

The sleeve 41 is manufactured, for example, with a flat knitting machine, which makes it possible to vary the cross section, that is to say, the diameter of the sleeve, to make shape variations for the heel, to create opening for passage of the laces, to vary the thickness of the wall of the sleeve, or in particular to vary the tightening of the loops. In fact, the flat knitting machine provides a wide range of adjustment possibilities, and it is adapted to make sleeves of all sizes, whether in diameter or in length. As such, the flat knitting is more practical than the circular knitting machine. Indeed, the circular knitting machine works on a reduced range in the area of the sleeve diameter. It is therefore necessary to use a plurality of different circular knitting machines to make a complete line of sleeves 41, that is to say, a complete line of shoes encompassing all shoe sizes, where a single flat knitting machine would be sufficient. In the end, a flat knitting machine makes it possible to make one or more three dimensional casings, with all desired features, and to the desired shoe size.

A yarn, in the context of the invention, is next described.

First, the yarn may be a monofilament obtained, for example, by extruding a hot-melt synthetic material, such as polyamide, polyurethane, polyethylene, or any equivalent or similar material. The production of a filament is continuous, in a way comparable to silk filament produced by a spider. The filament may be mono-component or mono-material, in the sense that its transverse cross section is uniform. But the filament may also be multi-component, e.g., bi-component. In this latter case, a transverse cross section of a filament shows a core comprised of a first material, and a peripheral envelope surrounding the core, such envelope being comprised of a second material. Each material can be hot-melt, or one material can be hot-melt. If both materials are hot-melt, their melting temperatures are different.

Then the yarn may be multi-filament. In this case, it is obtained by combining a plurality of filaments. Such an association is shown using the diagram of FIG. 6. Here, all of the filaments 49 are of the same type, in the sense that each has the same melting point. But combinations of filaments of different types can be provided, some of which may be fusible and others may not, or with different melting points. The filaments are associated with one another by any known technique.

Also, the yarn can be obtained in the form of a fiber mesh. Here, a fiber is a filament of limited length. The fibers are associated in tight contact to form the mesh, by any known technique, and especially by twisting. Retaining the fibers to one another is traditionally done by friction, especially natural fibers such as cotton. However, for the invention, retaining the fibers to one another occurs either by friction or by a combination of friction and melt-adhesion, or yet entirely by adhesion, because the invention uses hot-melt materials The general structure of the sleeve 41 having been presented, its use for the manufacture of the shoe 1 can next be explained. However, to remain in the context of the first embodiment, it is useful to first explain that the article of footwear 1, or shoe, includes a reinforcement 51. It is shown more clearly below that this reinforcement is associated with the casings 21, 31 by nesting at the time of manufacture of the shoe 1, in order to provide the latter with specific capabilities.

Figure 7:
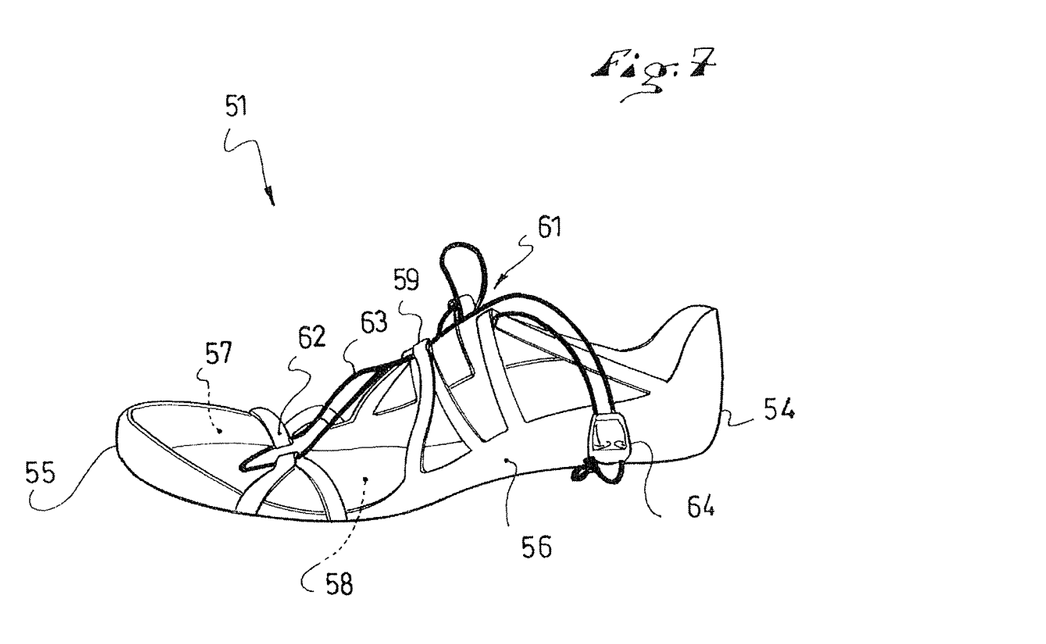
FIG. 7 is a side view of a reinforcement that is to be incorporated into the article of footwear according to FIG. 1.

As shown in FIG. 7, the reinforcement 51 is a part extending lengthwise from a rear end 54 to a front end 55, widthwise between a lateral side 56 and a medial side 57, and height-wise from base 58 to an upper end 59. The reinforcement 51 has a length and a width similar to the lengths and widths of the casings 21, 31. More specifically, the reinforcement 51 extends lengthwise, in relation to the first casing 21, from the rear end 24 to the front end 25, widthwise between the lateral side 26 and the medial side 27, and height-wise from the base 28, or bottom side, to the upper end 29, or top side. By definition, this makes it possible to reinforce the first casing 21, and therefore the article of footwear 1, in particular in the area of the base 12, or bottom side, and at the periphery of the base, or bottom side.

Although not essential, the reinforcement 51 carries a tightening device 61. The tightening device includes keepers 62 located, for example, in the area of the upper end 59, as well as a lace 63 and a blocking device 64, known to one with ordinary skill in the art. It is therefore possible to tighten or loosen the reinforcement 51 and, thereby, to tighten or loosen the shoe 1, as is more apparent below.

Figure 8:
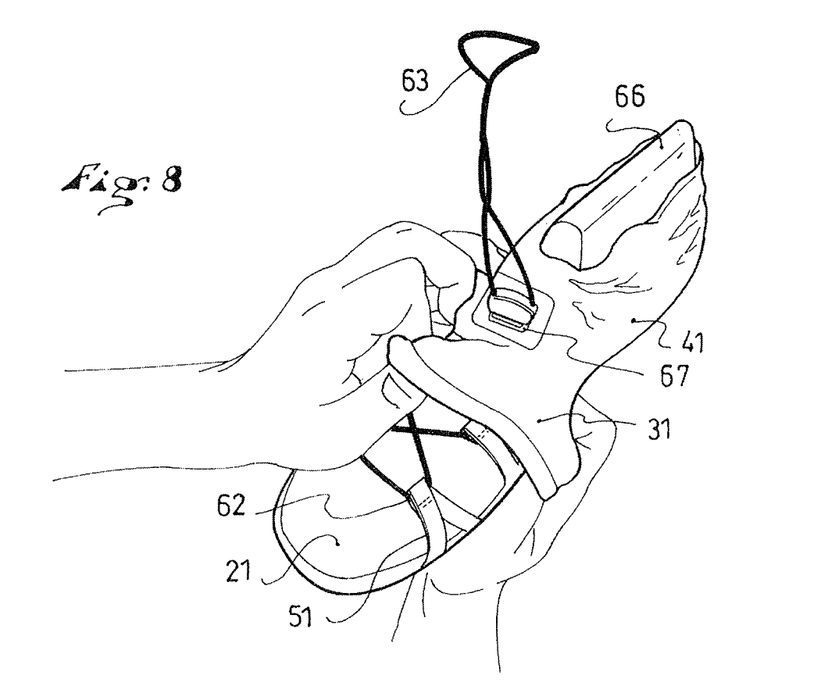
FIG. 8 is a perspective view related to the manufacture of the article of footwear according to FIG. 1.
Figure 9:
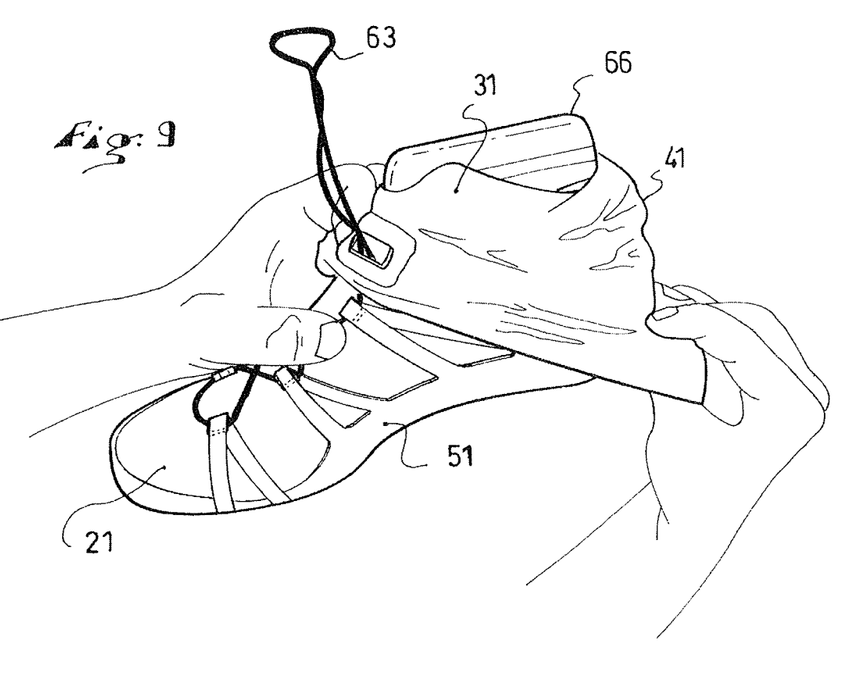
FIG. 9 is another perspective view related to the manufacture of the article of footwear according to FIG. 1.

The use of the sleeve 41 for the manufacture of the shoe 1 can next be discussed, with reference to FIGS. 8 and 9. In fact, the constituent elements of the shoe 1 are assembled by hand, without complex and expensive machinery as was the case for the prior art.

It is understood from FIGS. 8 and 9 that the sleeve 41 is slipped onto an element 66, referred to as a last, shaped to emulate the foot of a user. The sleeve is applied to the last 66 in the manner of a sock on a foot. The sleeve 41 conforms to the shape of the last 66 due to its elasticity, which is inherent in its textile structure. The elasticity that enables the sleeve 41 to be shaped is due to a reversible elastic deformation of the constituent meshes of the sleeve. Then the reinforcement 51 is nested on the subdivision of the sleeve 41 that becomes the first casing 21. Then the subdivision of the handle 41 that becomes the second casing 31 is folded over the reinforcement 51, thereby covering the latter and the subdivision assigned to the first casing. This is sufficient to form the subassembly of the shoe 1 which envelops the foot, a subassembly which ultimately includes the first casing 21, the reinforcement 51, and the second casing 22. The second casing 31 has an opening 67 for passage of the lace 63. It then suffices to subject the subassembly to a higher temperature, using any suitable technique, to melt the hot-melt filaments of the casings only as appropriate, and thus provide the shoe 1 with its geometry. After heating, the last 66 can be removed from the subassembly. The shoe 1 is then almost finished. It suffices, according to the first embodiment, to add an outer sole assembly 68 thereto. As shown in FIGS. 1 and 2, the article of footwear 1, or shoe, includes an outer sole assembly 68. This outer sole assembly is adapted to take support on the ground and, therefore, is structured to resist wear by friction and also to damp impacts. It thus includes a wear layer 69 and a damping layer 70, for example. FIG. 2, which is a transverse cross section in the region of the shoe adapted to receive the arch of the foot, shows that the base 12 has a non-planar geometry, substantially identical to that of the aforementioned arch. The shoe 1 according to the invention is indeed capable, as has been mentioned, to conform to the shape of the foot. It is thus not necessary to add an inner sole to the shoe 1 to reproduce the arch of the foot, or the other aspects of the base of the foot. This thus simplifies the shoe 1 according to the invention, compared to a prior art shoe. This also lightens the shoe 1 and thereby reduces the mechanical inertias. A resulting advantage is an improvement of the athletic performance. The shoe according to the invention is well suited, for example, to a long-distance runner.

FIG. 2 also shows that the reinforcement 51 is located between the first casing 21 and the second casing 31. As a corollary, the tightening device 61 is also mainly located between the first casing 21 and the second casing 31. This preserves the tightening device, for example by preventing the lace 63 from catching branches during a race in the forest.

Still with reference to FIG. 2, but also to FIG. 1, the first casing 21 and second casing 31 are shown to be continuous along a transverse cross section. These casings therefore extend continuously in the area of their respective top sides 29, 39, and thus in the area of the upper end 13 of the shoe. As a corollary, the shoe does not have a tongue. Therefore, the foot is completely and constantly enveloped.

As can be understood from FIG. 1, but also from FIG. 3, the boundary between the first casing 21 and the second casing 31 is a fold 73 demarcating a foot insertion opening 74. The periphery of the foot insertion opening 74 is therefore demarcated simply by folding the two casings 21, 31 on one another. This means that this periphery does not have a stitch or an attached element, as in the prior art and, therefore, that the shoe 1 does not cause discomfort to the user, including in the area of the opening 74.

By way of example, as seen in FIG. 3, the first casing 21 has three zones 81, 82, 83 with different mechanical properties. These properties are dependent upon the percentage of hot-melt filaments contained in the yarns. Without limitation, a first zone 81 with a high concentration of hot-melt filaments, for example between 60 and 100%, is provided here. The first zone 81 demarcates the base 28 and the periphery of the base. A second or intermediate zone 82 with an average concentration of hot-melt filaments, for example between 30 and 70%, is then provided. The second zone extends mainly in the area of the lateral 26 and medial 27 sides. A third zone 83 with a low concentration of hot-melt filaments, for example between 5 and 40% is finally provided. The third zone extends mainly in the area of the top side 29. This arrangement renders the first casing 21 relatively inflexible towards the bottom side 28, but progressively flexible towards the top side 29. The flexibility, or elasticity, is conditioned by the type of knitting meshes and/or by the elasticity of the constituent materials of the meshes. This elasticity enables the first casing 21 to remain in contact with the foot, the ankle, or the lower leg, thereby preventing the intrusion of foreign bodies. An elastic yarn kept tensioned provides good foot support.

Similarly, the second casing 31 has three zones 91, 92, 93 with different mechanical properties. These properties again are dependent upon the percentage of hot-melt filaments contained in the yarns. Without limitation, a first zone 91 with a high concentration of hot-melt filaments, for example between 60 and 100%, is provided here. The first zone 91 demarcates the bottom side 38 and the periphery of the bottom side. An intermediate or second zone 92 with an average concentration of hot-melt filaments, for example between 30 and 70%, is then provided. The second zone extends mainly in the area of the lateral 36 and medial 37 sides. A third zone 93 with a low concentration of hot-melt filaments, for example between 5 and 40%, is finally provided. The third zone extends mainly in the area of the top side 39. This arrangement renders the second casing 31 relatively inflexible towards the bottom side 38, but progressively flexible towards the top side 39. Here again, the flexibility towards the top side end enables the second casing 31 to remain pressed onto the foot, the ankle, or the lower leg, thereby preventing the intrusion of foreign bodies. Again, a casing comprising an elastic yarn kept tensioned provides good foot support.

For each casing 21, 31, the melting of filaments determines the physical or mechanical properties in proportion to the hot-melt filaments. For example, the greater their number is, in percentage, the higher the abrasion resistance. Conversely, if the percentage of hot-melt filaments is reduced, the elasticity is maintained. In other words, the higher the percentage of hot-melt filaments, the higher the abrasion resistance and, by corollary, the elasticity is reduced. Conversely, if the percentage of hot-melt filaments is low, then the abrasion resistance is low and, by corollary, the elasticity is significant.

Ultimately, when the casings 21, 31 are assembled, the flexibility of the shoe 1 increases vertically from the base 12 to the upper end 13. This enables the shoe to support the foot, on the one hand, and to reversibly widen in the area of the top side 13 to make it easier to put on or remove the shoe, on the other hand.

However, the aforementioned arrangements of the casings are not limiting. In particular, it is possible to provide each casing with the desired properties, such as elasticity, imperviousness, wear resistance, fungicidal properties, a desired aesthetic appearance, or the like.

Still according to the first embodiment, the thickness of the first casing 21 is less than or equal to 5.0 mm, considering that values of less than or equal to 3.0 mm have yielded good results. This lightens the first casing 21.

Similarly, the thickness of the second casing 31 is less than or equal to 5.0 mm, considering that values of less than or equal to 3.0 mm have yielded good results. This lightens the second casing 31.

For each casing 21, 31, thickness is measured after melting the yarns comprising at least one hot-melt filament.

Ultimately, the shoe 1 according to the invention is lighter than a shoe according to the prior art, with comparable technical specifications.

Other embodiments of the invention are briefly described below with reference to FIGS. 10 to 23. For reasons of convenience, mainly the differences from the first embodiment are identified. In addition, the same reference numerals are used for identical or similar elements seen in the first embodiments.

Figure 10:
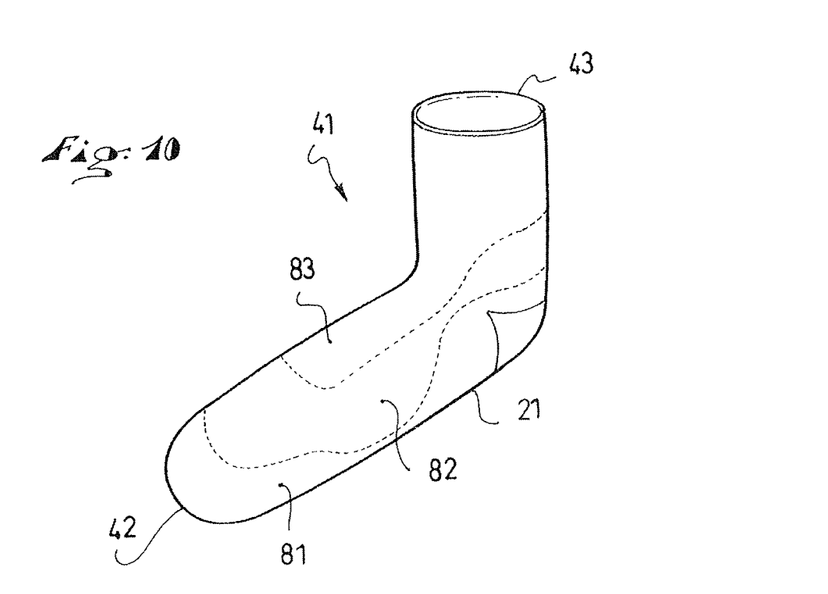
FIG. 10 is a schematic perspective view of a preform used for making a first casing, according to a second embodiment of the invention.
Figure 11:
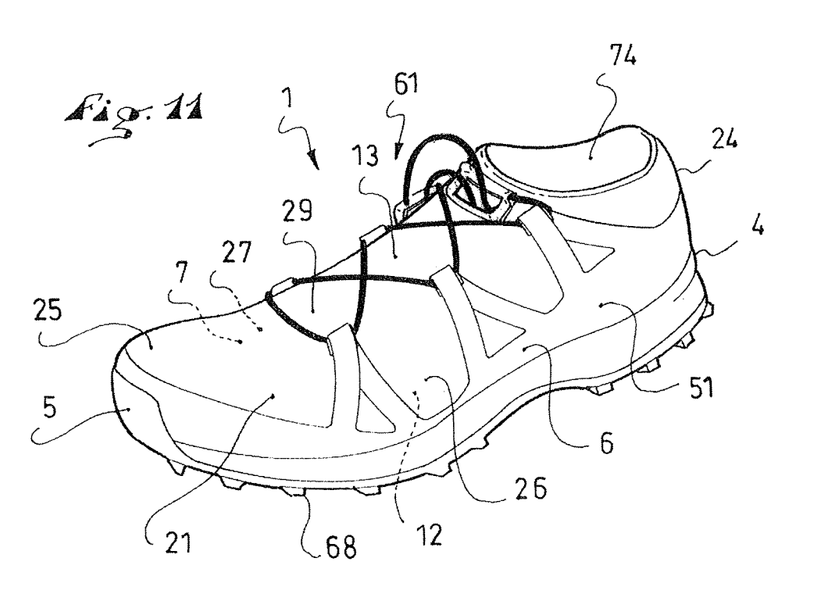
FIG. 11 is a front perspective top view of an article of footwear obtained from the preform of FIG. 10.

Thus, the second embodiment, according to FIGS. 10 and 11, features an article of footwear or shoe 1 with a rear end 4 and a front end 5, a lateral side 6 and a medial side 7, or a base 12, or bottom side, and an upper end 13, or top side.

What is specific to the second embodiment is the structure of the preform or sleeve 41. The sleeve extends well between a first end 42, which is for example closed, and a second open end 43. However, the sleeve 41 is sized to obtain the first casing 21, or envelope, only, to the exclusion of any other casing or casing subdivision. Accordingly, it is the open end 43 of the first casing 21 which alone demarcates the foot insertion opening 74. The shoe 1 according to the second embodiment therefore comprises the first casing 21, or envelope, and the reinforcement 51, with its tightening device 61, to the exclusion of any additional casing or envelope. It can also be said that the reinforcement 51 covers the first casing 21. This means that the shoe 1 is further lighter than the shoe according to the first embodiment. Also provided is an outer sole assembly 68 for the shoe according to the second embodiment, although this is not essential.

Figure 12:
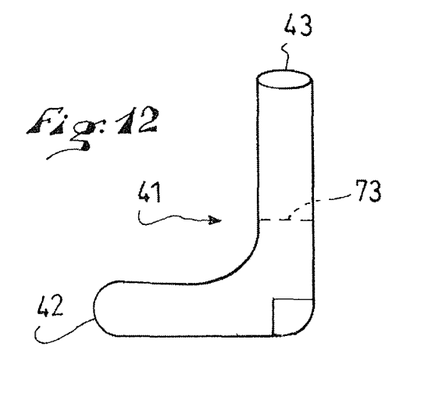
FIG. 12 is a schematic side view of a preform for a third embodiment of the invention.

For the third embodiment according to FIG. 12, the sleeve 41, which extends between a first closed end 42 and a second open end 43, is used to obtain two casings 21, 31, or envelopes. The portion of the sleeve for the first casing 21 is bent, whereas the portion of the sleeve for the second casing is straight.

Figure 13:
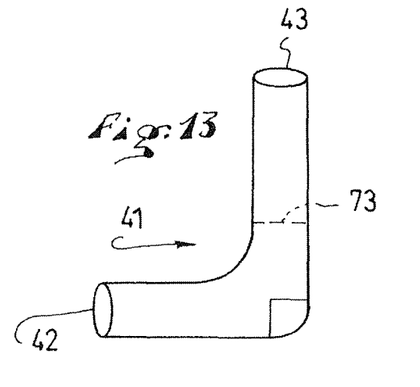
FIG. 13 is a schematic side view of a preform for a fourth embodiment of the invention.

For the fourth embodiment according to FIG. 13, the sleeve 41, which extends between a first open end 42 and a second open end 43, is used to obtain two casings 21, 31, or envelopes. Again, the portion of the sleeve for the first casing 21 is bent, whereas the portion of the sleeve for the second casing is straight.

Figure 14:
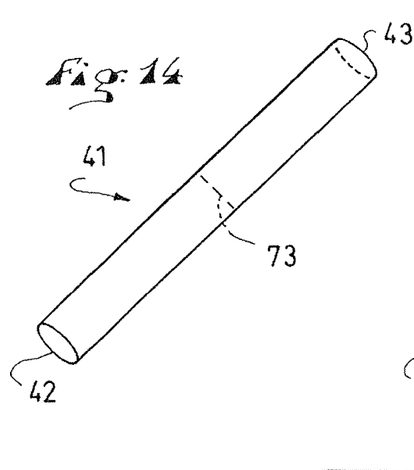
FIG. 14 is a schematic side view of a preform for a fifth embodiment of the invention.

For the fifth embodiment according to FIG. 14, the sleeve 41 used to obtain two casings 21, 31, or envelopes, is straight and open at each end 42, 43.

Figure 15:
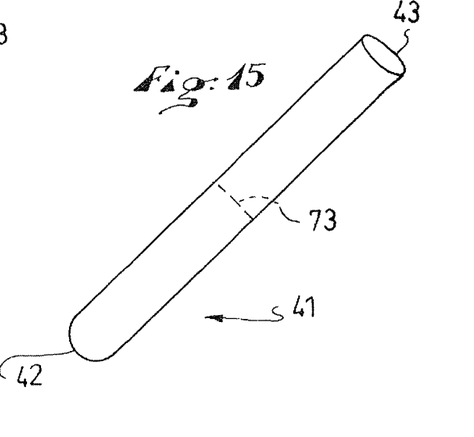
FIG. 15 is a schematic side view of a preform for a sixth embodiment of the invention.

For the sixth embodiment according to FIG. 15, the sleeve 41 used to obtain two casings 21, 31, or envelopes, is straight, closed at the first end 42 and open at the second end 43.

Figure 16:
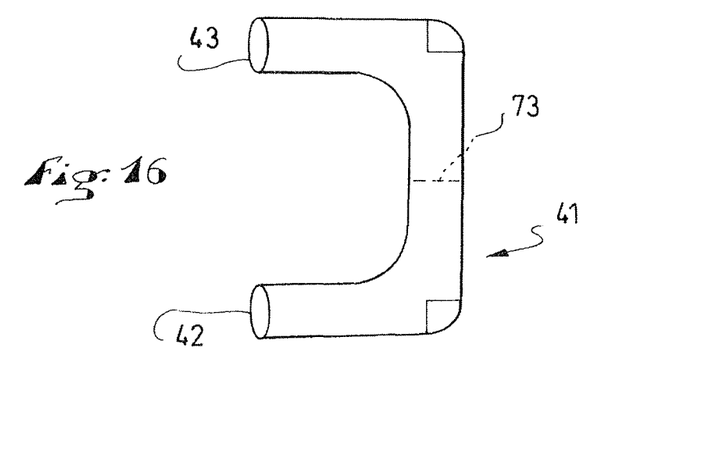
FIG. 16 is a schematic side view of a preform for a seventh embodiment of the invention.

For the seventh embodiment according to FIG. 16, the sleeve 41, which extends between a first open end 42 and a second open end 43, is still used to obtain two casings 21, 31, or envelopes. The portion of the sleeve for the first casing 21 is bent, and the portion of the sleeve for the second casing 31 is also bent.

Figure 17:
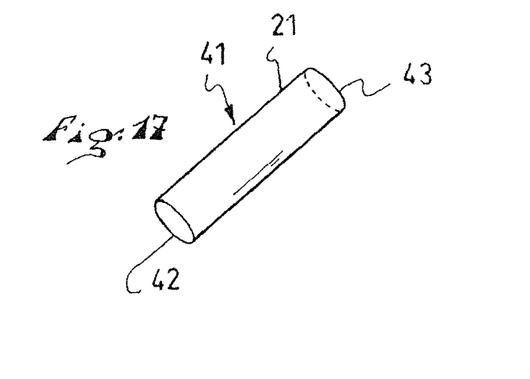
FIG. 17 is a schematic view of a preform for an eighth embodiment of the invention.

For the eighth embodiment according to FIG. 17, the sleeve 41, which extends between a first open end 42 and a second open end 43, is used to obtain a single casing 21, or envelope. It is observed, in this case, that the sleeve 41 is straight. But then again, it may be provided to seal the first end 42 by any technique known to one with ordinary skill in the art.

Figure 18:
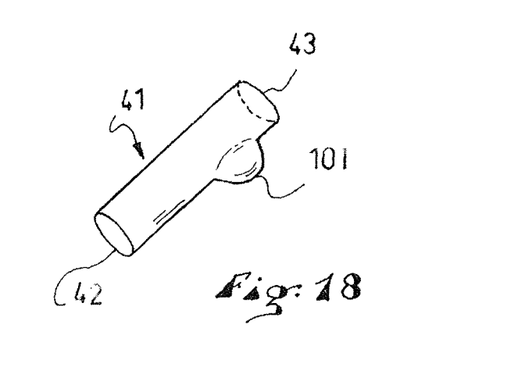
FIG. 18 is a schematic view of a preform for a ninth embodiment of the invention.

For the ninth embodiment according to FIG. 18, the sleeve 41 still extends between a first end 42 and a second end 43. What is specific to this embodiment is that the sleeve 41 has a projection 101. The latter is located between the ends and is obtained, in a known manner, for example by locally increasing the number of loops or meshes made by knitting. The projection 101 demarcates a cavity which opens out into the sleeve 41. The projection can be used, for example, to house the heel of the user's foot in the finished shoe.

Figure 19:
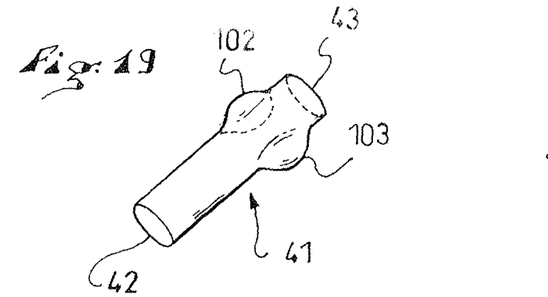
FIG. 19 is a schematic view of a preform for a tenth embodiment of the invention.
Figure 20:
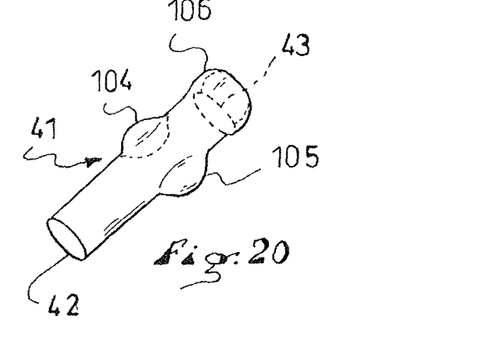
FIG. 20 is a schematic view of a preform for an eleventh embodiment of the invention.
Figure 21:
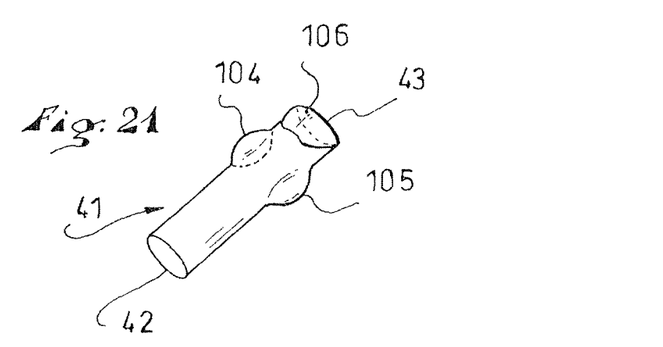
FIG. 21 is similar to FIG. 20.

For the tenth embodiment according to FIG. 19, the sleeve 41 still extends between a first end 42 and a second end 43. What is specific to this embodiment is that the sleeve 41 has two projections 102, 103. These projections are located between the ends and each demarcate a cavity which opens out into the sleeve 41. Here, the projections are each located at a same distance from one end 42, 43, and serve, for example, to house the projecting portions of the ankle joint of the user in the finished shoe.

For the eleventh embodiment according to FIGS. 20, 21, the sleeve 41 again extends between a first end 42 and a second end 43. What is specific to this embodiment is that the sleeve 41 has three projections 104, 105, 106. Two 104, 105 of these projections are arranged between the ends, and each demarcate a cavity which opens out into the sleeve 41. These two projections 104, 105 are each located at a same distance from one end 42, 43, and serve, for example, to house the projecting portions of the ankle of the user in the finished shoe. The third projection 106 is located in the area of one end 43. This projection is for example folded against the sleeve 41 to form a storage pocket. The pocket for example receives a lace-blocking device, not shown but well known to one with ordinary skill in the art.

Figure 22:
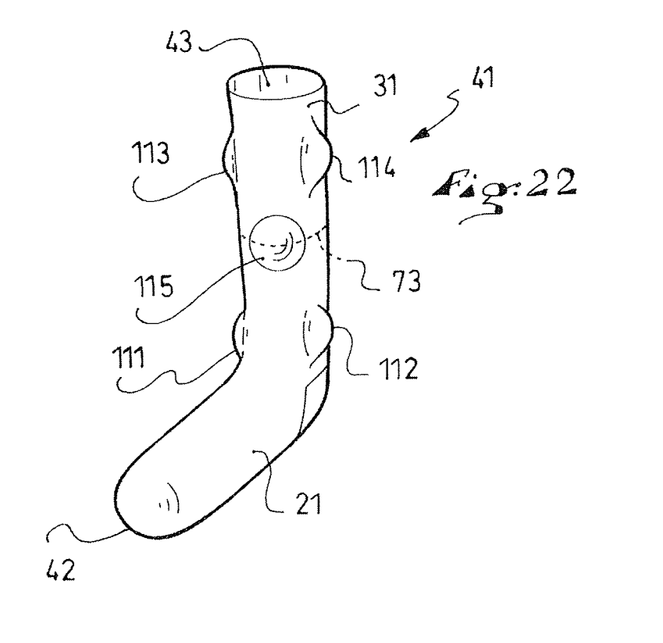
FIG. 22 is a schematic view of a preform for a twelfth embodiment of the invention.

For the twelfth embodiment according to FIG. 22, the sleeve 41 extends between a first closed end 42 and a second open end 43. Here, the sleeve 41 allows obtaining both the first bent casing 21 and the second straight casing 31, the boundary between the two being a fold 73 as noted above. What is specific to this embodiment is that the sleeve 41 has five projections 111, 112, 113, 114, and 115. Two 111, 112 of these projections are arranged in the area of the first casing 21 for housing the projecting portions of the ankle of the user in the finished shoe. Two other projections 113, 114 are arranged in the area of the second casing 31, also for housing the projecting portions of the ankle. Ultimately, in the finished shoe, the projections 111, 112 of the first casing 21 are housed in the projections 113, 114 of the second casing 31. It is further observed that the sleeve 41 has a fifth projection 115 in the area of the boundary 73 between the casings 21, 31. This projection 115 is intended to form a projecting portion of the finished shoe, such as a pocket or a gripping member.

Figure 23:
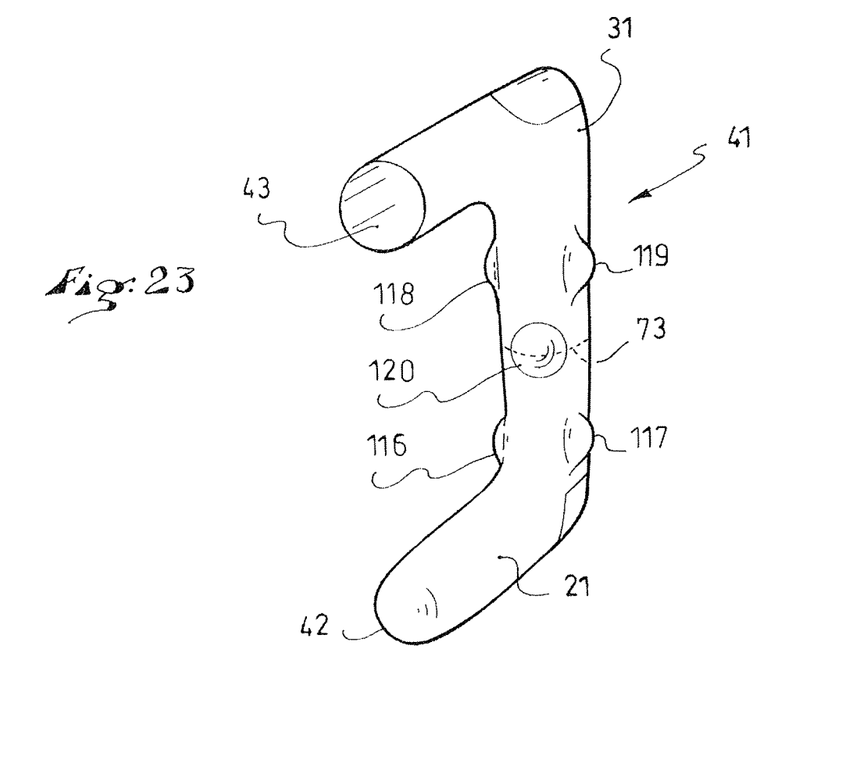
FIG. 23 is a schematic view of a preform for a thirteenth embodiment of the invention.

Finally, for the thirteenth embodiment according to FIG. 23, the sleeve 41 extends between a first closed end 42 and a second open end 43. What differentiates this embodiment from the previous one is that the first casing 21 is bent, and that the second casing 31 is also bent. For the remainder, the sleeve 41 according to the thirteenth embodiment has, in a non-limiting fashion, five projections 116, 117, 118, 119 and 120, similar to the projections 111, 112, 113, 114 and 115, respectively, of the sleeve 41 according to the twelfth embodiment.

In any case, the invention is made from materials known to one with ordinary skill in the art. For example, a casing 21, 31 comprises a copolymer. The invention also uses certain known techniques, in particular for preparing the sleeve 41 or the outer sole assembly 68.

The invention is not limited to the embodiments described above, and includes all technical equivalents that fall within the scope of the claims that follow.

In particular, it can be provided to add one or more casings to the article of footwear 1.

The reinforcement may be provided to be located outside of the article of footwear, thereby covering all of the casings, directly or indirectly.

A different number than three may be provided for the zones of the casings, or envelopes, with different mechanical or physical properties. For example, there may be one, two, four, five, or more.

Adhesive filaments or yarns may be included in the structure of the sleeve 41 and, therefore, in each casing 21, 31. The adhesive acts by melting, for example to affix the casings to one another, to affix the reinforcement 51 to a casing, possibly to affix an inner liner to the first casing 21, or an outer protective layer to the second casing 31 or to the first casing 21. Finally, in this case, at least one casing 21, 31 comprises hot-melt adhesive filaments or yarns.

With respect to the projections, their number is not limited. There may be none, but there may also be one, two, three, four, five, and possibly more. A projection may in some cases act as a gripping member, for example to help put on the shoe.

A projection may project outside of the sleeve, or conversely penetrate into the sleeve. A projection is therefore a relief, such as a protuberance, obtained by a non-uniform weaving of the sleeve.

With respect to the aesthetic appearance of the article of footwear, the yarns selected to manufacture the casings can have different colors, or comprise different materials.

The invention claimed is:

1. An article of footwear comprising:
a unitary one-piece structure formed from a tubular preform sleeve, the unitary one-piece structure comprising at least a first sleeve portion and a second sleeve portion, the first sleeve portion having a length extending lengthwise from a rear end to a front end, widthwise between a lateral side and a medial side, and heightwise from a bottom side to a top side, the bottom side extending from the lateral side to the medial side;
the first sleeve portion further comprising:
yarns linked to one another mechanically;
at least a portion of the yarns comprising at least one hot-melt filament;
the yarns being distributed continuously through an entirety of the first sleeve portion to form a unitary structure, including each of the lateral side, the medial side, the top side, and the bottom side; and
the first sleeve portion comprising a shape having been set by the at least one hot-melt filament of the portion of the yarns having been melted; and
the second sleeve portion extending over and outside of the first sleeve portion and lengthwise from a rear end to a front end, widthwise between a lateral side and a medial side, and heightwise from a bottom side to a top side, the bottom side extending from the lateral side to the medial side; and a reinforcement covering the first sleeve portion; the second sleeve portion covering the reinforcement, and the reinforcement being located between the first sleeve portion and the second sleeve portion, and wherein a terminal end of the first sleeve portion of the unitary one-piece structure is continuous with and lengthwise coextensive with a terminal end of the second sleeve portion.

2. Article of footwear according to claim 1, wherein:
the second sleeve portion comprises:
  yarns linked to one another mechanically;
  at least a portion of the yarns of the second sleeve portion comprising at least one hot-melt filament;
  the yarns are distributed continuously through an entirety of the second sleeve portion, including each of the lateral side, the medial side, the top side, and the bottom side; and
  the second sleeve portion has a shape having been set by the at least one hot-melt filament of the portion of the yarns of the second sleeve portion having been melted.

3. Article of footwear according to claim 2, wherein:
the rear end, the front end, the lateral side, the medial side, and the top side of the first sleeve portion are positioned, respectively, at a rear end, a front end, a lateral side, a medial side, and a top side, of the article of footwear.

4. Article of footwear according to claim 3, wherein:
the rear end, the front end, the lateral side, the medial side, the bottom side and the top side of the second sleeve portion demarcate, respectively, outer surfaces of the rear end, the front end, the lateral side, the medial side, and the top side of the article of footwear.

5. Article of footwear according to claim 1, wherein:
a boundary between the terminal end of the first sleeve portion and the terminal end of the second sleeve portion is a fold demarcating a periphery of a foot insertion opening of the article of footwear.

6. Article of footwear according to claim 1, wherein:
the first sleeve portion and the second sleeve portion of the unitary one-piece structure are lengthwise coextensive and both of the first and second sleeve portions have a closed tubular shape.

7. Article of footwear according to claim 1, wherein:
the first sleeve portion has three zones, each of the three zones having a mechanical property different from others of the mechanical properties of others of the three zones of the first sleeve portion.

8. Article of footwear according to claim 7, wherein:
the second sleeve portion has three zones, each of the three zones having a mechanical property different from others of the mechanical properties of others of the three zones of the second sleeve portion.

9. Article of footwear according to claim 1, wherein:
the second sleeve portion has a thickness less than or equal to 5.0 mm.

10. Article of footwear according to claim 9, wherein:
the first sleeve portion has a thickness less than or equal to 5.0 mm.

11. Article of footwear according to claim 5, wherein:
the boundary does not have a stitch or an attached element.

12. Article of footwear according to claim 1, wherein:
the reinforcement extends lengthwise, in relation to the first sleeve portion, from the rear end to the front end, widthwise between the lateral side and the medial side, and heightwise from the bottom side to the top side.

13. Article of footwear according to claim 1, further comprising:
an outer sole assembly secured below the bottom side of at least the second sleeve portion.

14. Article of footwear according to claim 1, wherein:
the first sleeve portion comprises a polymer and the second sleeve portion comprises a polymer.

15. Article of footwear according to claim 1, wherein:
the at least one hot-melt filament of the portion of the yarns of the first sleeve portion is at least one hot-melt adhesive;
the at least one hot-melt filament of the portion of the yarns of the second sleeve portion is at least one hot-melt adhesive;
the first and second sleeve portions being affixed together via the hot-melt adhesives of the first and second sleeve portions.

16. Article of footwear according to claim 1, wherein:
an entirety of the unitary one-piece structure is formed from an elastic textile unitary one-piece structure.

17. Article of footwear according to claim 16, wherein:
less than an entirety of the yarns of the first sleeve portion includes a hot-melt filament; and
less than an entirety of the yarns of the second sleeve portion includes a hot-melt filament.

18. Article of footwear according to claim 1, wherein:
the at least one hot-melt filament of the portion of the yarns of the first sleeve portion is at least one hot-melt adhesive; and
the reinforcement is adhesively affixed to the first sleeve portion by means of the at least one hot-melt adhesive.

19. Article of footwear according to claim 1, wherein:
a boundary between the terminal end of the first sleeve portion and the terminal end of the second sleeve portion is a fold demarcating a periphery of a foot insertion opening of the article of footwear; and the boundary does not have a stitch or an attached element.

20. Article of footwear according to claim 1, wherein:
the front end of the first sleeve portion is open.

* * * * *